May 15, 1951     J. R. CLIFTON ET AL     2,552,843
SEQUENCE CONTROL FOR LANDING GEARS

Filed Aug. 23, 1948     5 Sheets-Sheet 1

INVENTORS
JOHN R. CLIFTON
BY STANLEY R. PARKER
Herbert E. Metcalf
Attorney

May 15, 1951  J. R. CLIFTON ET AL  2,552,843
SEQUENCE CONTROL FOR LANDING GEARS
Filed Aug. 23, 1948  5 Sheets-Sheet 2
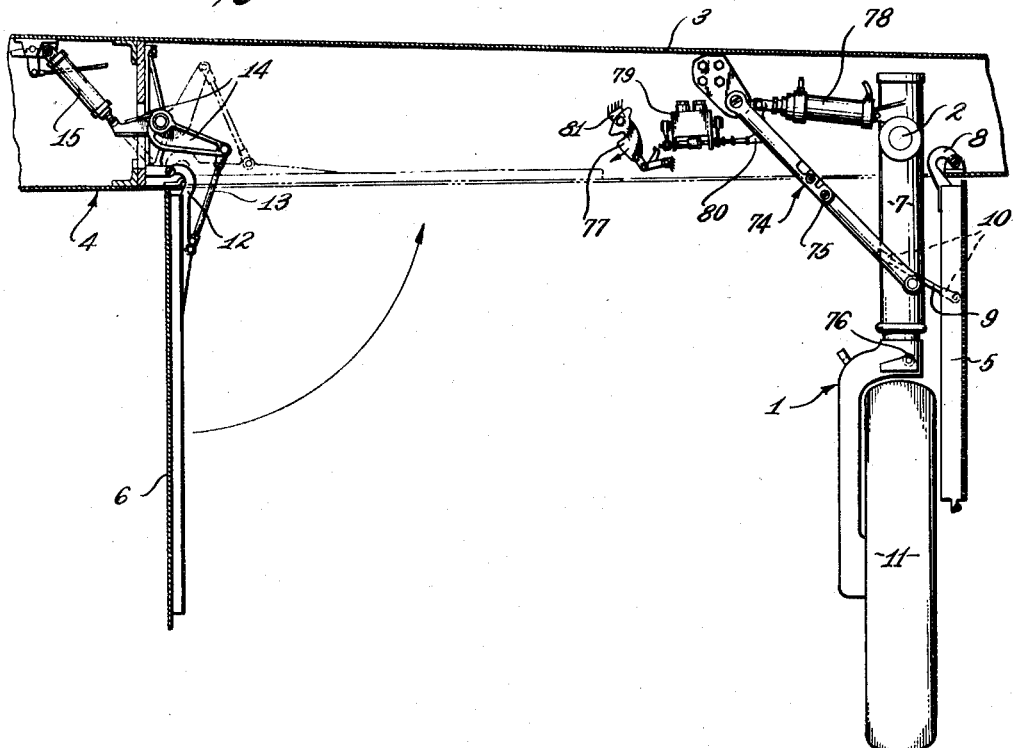
Fig. 3
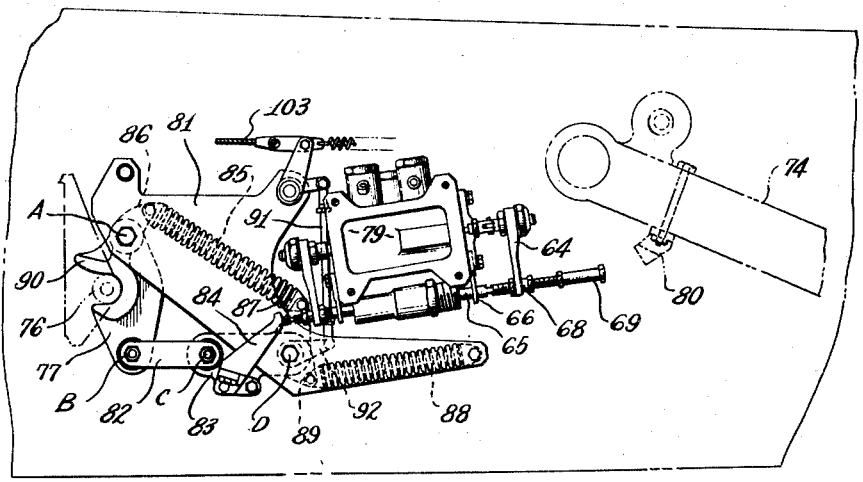
Fig. 4
INVENTORS
JOHN R. CLIFTON
BY STANLEY R. PARKER
Attorney

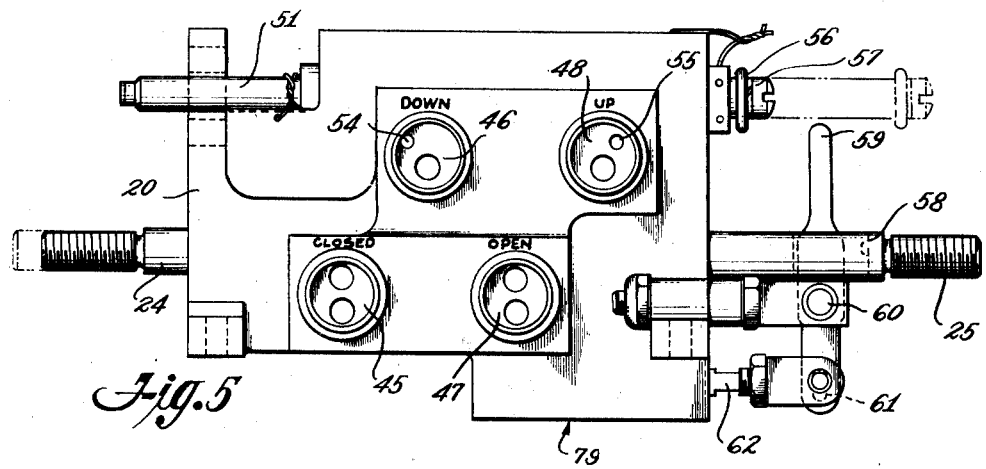
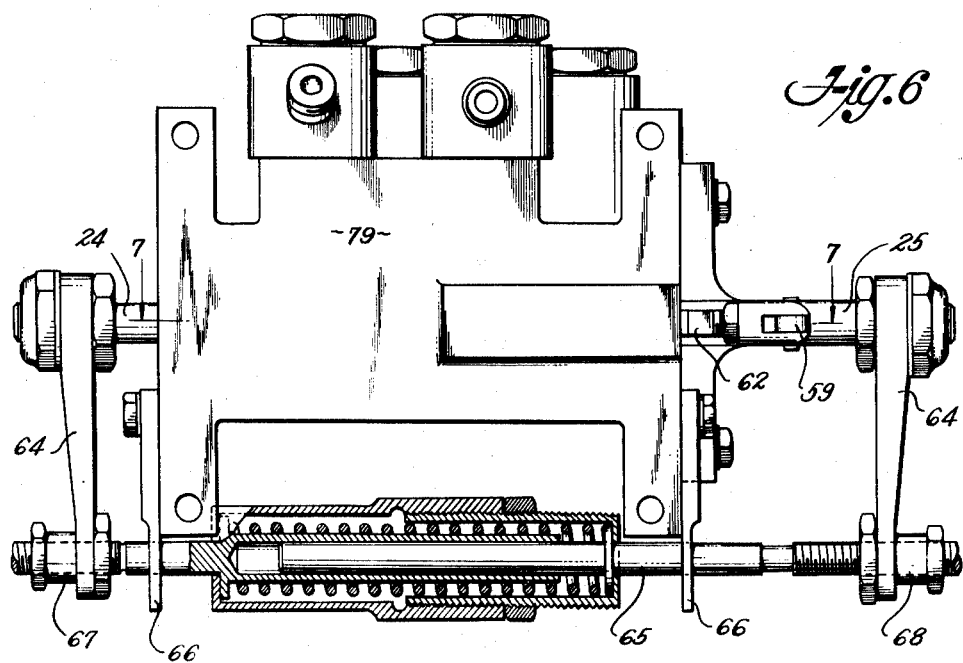

INVENTORS
JOHN R. CLIFTON
STANLEY R. PARKER
BY
Herbert E. Metcalf
Attorney

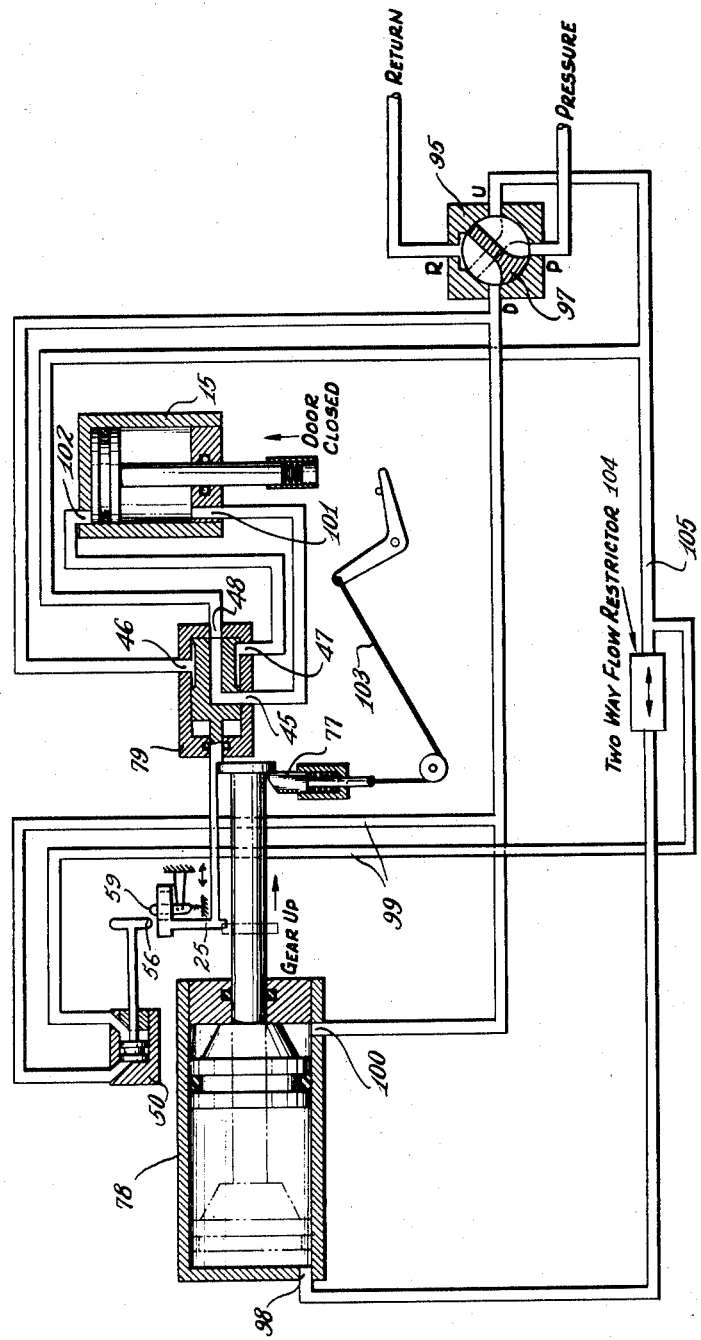

Patented May 15, 1951

2,552,843

UNITED STATES PATENT OFFICE 2,552,843

SEQUENCE CONTROL FOR LANDING GEARS

John R. Clifton, Inglewood, and Stanley R. Parker, Los Angeles, Calif., assignors to Northrop Aircraft, Inc., Hawthorne, Calif., a corporation of California Application August 23, 1948, Serial No. 45,774

10 Claims. (Cl. 244—102)

This invention relates to hydraulic controls, and, more particularly, to a sequence valve ideally adapted for selecting the proper direction of flow of hydraulic or other fluid to landing gear actuators, in accordance with the position of a landing gear control lever and the landing gear itself.

Landing gear, the wheels and struts used to support the airplane on the ground, originally projected from the airframe at all times, thereby reducing the lift-drag ratio of the airplane in flight. As airplanes became larger, drag was reduced by making the landing gear retractable into the airframe, a closure or door usually being provided to restore the surface contour when the gear was housed. In many instances it was necessary to house the gear in the wing and the closure in consequence became part of the effective lift producing surface of the airplane.

When the landing strut and attached wheel or wheels was relatively small, or when the gear was retracted rearwardly, the lateral extent of the recess left open when the gear was extended was relatively small, and the airplanes could take off and land without difficulty with the recess left open. The door, or cover for the gear in this type of installation was usually mechanically actuated by movement of the gear itself and opened with the gear and closed with the gear. This mechanical linkage was usually simple, and positive in action.

However, with the advent of still larger airplanes; airplanes adapted to take off with extremely heavy loads; and with the construction of high speed airplanes with thin wing sections where the gear must of necessity be retracted laterally, the size of the recess left in the lower surface of the wing became so large that from an aerodynamic standpoint the lift loss is serious, when the recess is left open during flight. This loss of lift also takes place at a time when the best possible lift-drag ratio is the most desired, i. e. during take off and landing procedures. It is desirable, therefore, to open and close a maximum portion of the landing gear door housing recess along with movement of the gear itself, so that this door (or doors) may be closed both after the gear is retracted and after it is extended, to retain as much of the original wing contour as possible. While it is not possible to both open and close all of the gear cover, it is possible to open or close a minimum of cover area along with the gear and to close the remainder of cover area both after extension and after retraction of the gear.

For convenience in description herein the minimum gear recess closure portion attached to or moved by the gear with the gear is termed the gear cover, the remaining portion of the closure is termed the gear door.

To close the gear door after both extension and retraction, a sequence of operation must be obtained such that, with movement of the pilot's landing gear control handle from one extreme position to the other, first the door will open, second the landing gear will extend or retract, and third the door will close.

If it were practical to mechanically and directly connect the door with the landing gear in some manner so that the door would open and close during the extension cycle, and during the retraction cycle, of the gear, no difficulty would be encountered in obtaining the proper sequence of operation. With large and heavy gear structures and large doors such direct mechanical connections have not been found practical, as they would be complicated and heavy. In consequence, it has been found highly desirable to provide the gear with a power actuator, and to provide the door with a separate power actuator. In many systems of this latter type, it is necessary to allow the extension or retraction cycle of the gear to proceed to completion before reversing the control lever, else the door might be closed while in the path of the landing gear. Therefore, such systems are not foolproof in operation, since there is always the possibility of collision between the landing gear and door by improper control by the pilot. In very large airplanes, the gear extension or retraction cycle may take nearly a minute's time.

It is an object of this invention to provide a means and method of synchronization which will make a landing gear door control system, wherein the gear and door are separately powered, entirely reversible at any time, which will prevent collision between the landing gear and the door even if the pilot should change his mind and reverse his controls during a cycle of gear operation, and which will accomplish this objective in the simplest manner. Along with preventing any possible mal-function of the gear and door, this invention makes for safer and faster operation of the landing gear in case of baulked landings or other emergencies where it may be desirable to reverse the extension or retraction direction of the landing gear while it is still in motion.

Due to many factors, such as, for example, the danger of fire, hydraulically operated systems are, in many instances, preferred for handling heavy loads such as landing gear operation. Due, however, to temperature changes of the hydraulic fluid and of the motors themselves as well as variations in applied power due to other reasons, a plurality of hydraulic motors cannot be relied upon to synchronize on the basis of speed alone, as might be accomplished when using synchronous electric motors. It is another object of the present invention to provide a sequence valve for the control of a plurality of hydraulic motors or actuators, in order that a strict sequence of operation can be obtained in a complicated cycle, with full reversibility of direction being available at any point in the cycle.

Other objects and advantages of this invention will be apparent or will be specifically pointed out in the description forming a part of the specification, but the invention is not limited to the embodiment herein described, as various forms may be adopted within the scope of the claims.

In the drawings:

Figure 3 is a front view similar to Figure 2, showing the landing gear, gear cover, and gear door in the fully open position after being extended laterally, and also showing the gear uplock hook and associated parts.

Figure 4 is a front view of the landing gear uplock installation, on a larger scale than that of Figure 3, showing the mechanism which operates a door sequence valve.

Figure 5 is a top view of the door sequence valve, viewed with port fittings removed.

Figure 6 is a front view, partly sectional, of the door sequence valve assembly, showing the operating attachments on the valve of Figure 5.

Figure 8 is a schematic diagram showing the landing gear hydraulic operating circuit for one main gear.

In broad terms, the present invention comprises a four-way sequence valve assembly which is actuated mechanically by the landing gear in both of its two extreme positions to close the landing gear door. This valve incorporates a resetting device consisting of a small operating cylinder and transfer rod, supplied with hydraulic fluid simultaneously with the door sequence valve and gear actuating cylinder, which operating cylinder automatically reverses the sequence valve if the landing gear control handle is reversed during any intermediate position of the landing gear. Thus, the door will be held open under pressure until the gear is either finally retracted, or finally extended.

Figure 1:
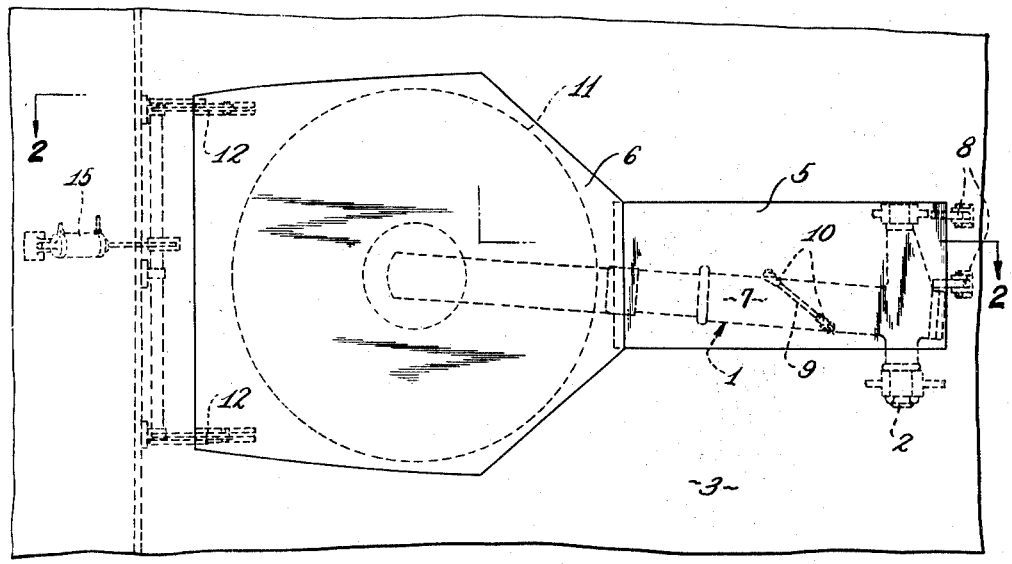
Figure 1 is a bottom view of a portion of a thin section airplane wing, showing the outline of the contained landing gear in the retracted position, with the landing gear door and cover closed.
Figure 2:
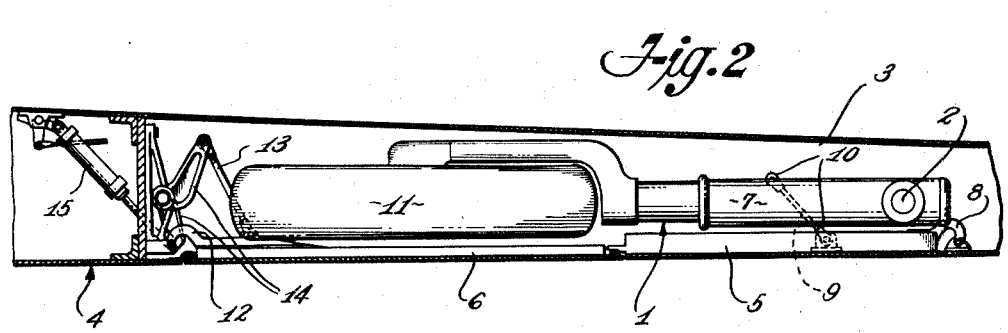
Figure 2 is a front view of the gear and door assemblies shown in Figure 1, partly cut away and partly sectional, taken along the broken line 2—2 of Figure 1.

This invention may be more fully understood through the following detailed description and by direct reference to the drawings. In Figures 1 through 3, the overall landing gear and door operation is shown. A landing gear assembly 1 is supported on a trunnion pin 2 located within the structure of an airplane wing 3. From its extended position, the gear assembly 1 swings upwardly and in the inboard direction to a retracted position above the wing lower surface 4. In this position, the wing lower surface 4 directly under the gear is closed by a gear cover 5 and a gear door 6. The gear cover 5 is located under a shock strut 7 of the gear assembly and is supported by the wing 3 at the outboard edge of the cover by cover hinges 8. This gear cover 5 is also attached directly to the landing gear by a cover rod assembly 9 which is connected at free-rotating rod terminals 10 to the gear shock strut 7 and to a point on the gear cover 5 toward its inboard end. This rod connection holds the cover 5 in a position faired in with the lower wing contour when the gear is retracted, and pushes the cover open to a position beside the gear when the gear is extended, as in Figure 3.

The gear door 6 is located under the landing wheel 11 of the gear assembly 1, as in Figures 1 and 2, and is supported by the wing 3 at the inboard edge of the door 6 by door hinges 12. This gear door 6 is actuated by a push rod 13 connected to a bellcrank 14 operated by a hydraulic door actuating cylinder 15. The gear door 6 is closed, completing its portion of the lower wing contour, when the gear assembly 1 is retracted, opens at the start of the extension cycle to allow a clear path for the exit of the gear, and closes again when the gear is completely extended, as shown by the phantom-line door position in Figure 3. Hydraulic fluid pressure is directed to the proper side of the door actuating cylinder 15 to obtain this sequence of operation by a door sequence valve which will be described next.

Figure 7:
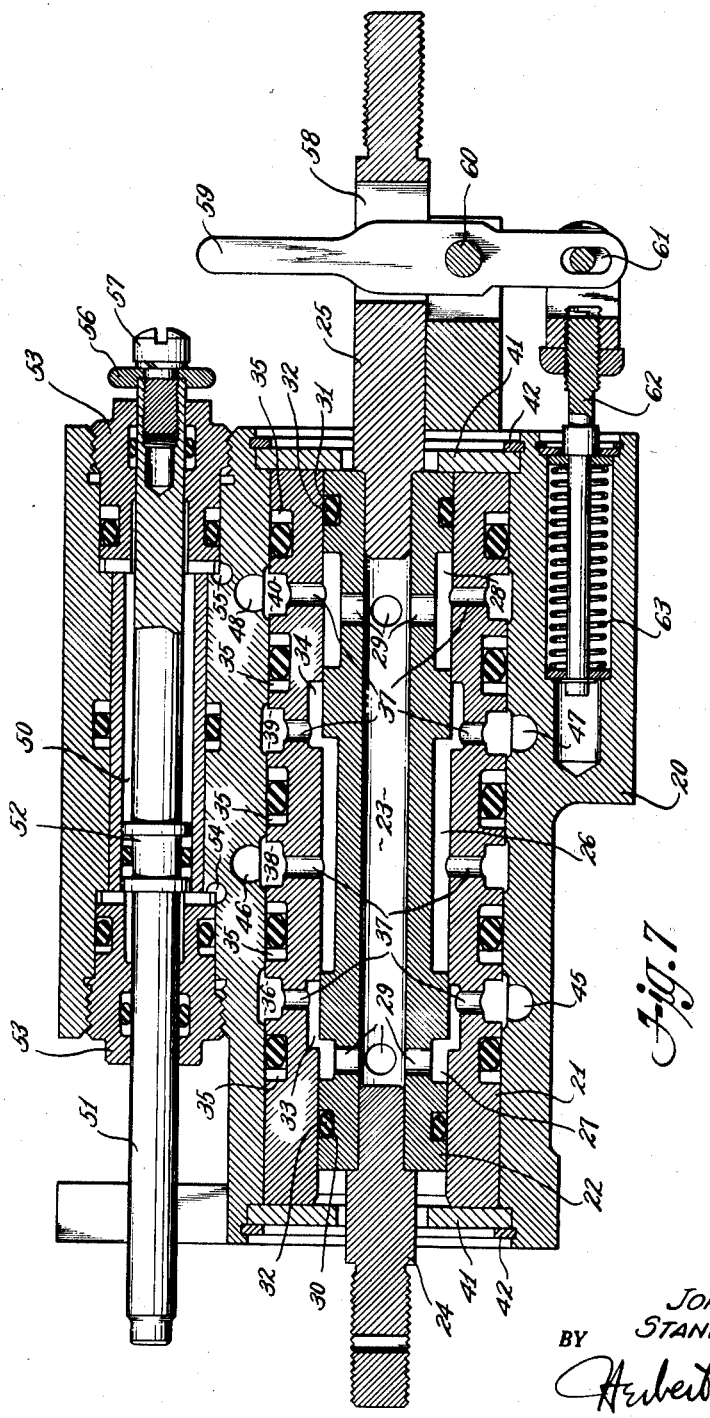
Figure 7 is a top sectional view showing the sequence valve only, the plane of section being indicated by the line 7—7 of Figure 6.

In Figure 7, a valve body 20 contains a fixed cylindrical sleeve 21 and a cylindrical spool 22 sliding within the sleeve 21. The spool 22 has an internal hollow passage 23 plugged with two spool ends 24 and 25 brazed in place. The exterior of the spool 22 is provided with three oil-carrying grooves—a wide center groove 26 and two narrow end grooves 27 and 28, the latter two having four radially drilled spool passages 29 each, communicating with the hollow passage 23. Beyond each end groove 27 and 28 is a packing groove 30 and 31 provided with packing rings 32 to seal against external oil leakage.

The interior of the sleeve 21 has two oil grooves 33 and 34 spaced just as far apart as the normal diameter portions of the spool 22 at the ends of the spool center groove 26. The exterior of the sleeve 21 has nine equally spaced grooves, the first and each alternate groove thereafter being packing ring grooves 35, and the remaining four alternate grooves being oil-carrying. Progressing from left to right, the first oil groove 36 in the outside of the sleeve 21 is connected with the left interior sleeve groove 33 by six radially-drilled sleeve passages 37. The second outer sleeve oil groove 38 is connected with the sleeve interior opposite the spool center groove 26 by another set of six radial sleeve passages 37. The third outer sleeve oil groove 39 is similarly connected with the right interior sleeve groove 34, and the fourth outer sleeve oil groove 40 is likewise connected with the interior of the sleeve 21 opposite the right end oil groove 28 in the spool 22.

The sleeve 21 is held in place within the valve body 20 by two end washers 41 and snap rings 42. The spool body 22 is also confined between these end washers, but the spool ends 24 and 25 extend through the washer holes. The spool 22 has a stroke of about $\frac{3}{16}$ inch. In the extreme right-hand position of the spool 22, the first outer oil groove 36 of the sleeve 21 is open through the spool hollow passage 23 to the fourth outer sleeve oil groove 40, and the second outer sleeve oil groove 38 is open by means of the spool center groove 26 and the right interior sleeve groove 34 to the third outer sleeve oil groove 39. In the extreme left-hand position of the spool 22, flow passages are reversed so that the first outer sleeve oil groove 36 is open through the spool center groove 26 to the second outer sleeve oil groove 38, and the third outer sleeve oil groove 39 is open through the right-hand spool end groove 28 to the fourth outer sleeve oil groove 40, all previous groove communications being closed at this time by the close fit of the spool outside diameter in the sleeve inside diameter.

Four port passages are drilled through from the outside of the valve body 20, each at the proper place to intersect one of the outer sleeve grooves. A "close" port 45 enters the first outer sleeve oil groove 36, a "down" port 46 enters the second groove 38, an "open" port 47 enters the third groove 39, and an "up" port 48 enters the fourth groove 40. Thus, following the routes described above, depending upon the valve spool 22 position, either the "down" port 46 is open to the "close" port 45 while the "up" port 48 is "open" to the "open" port 47, or the "down" and "open" ports are connected while the "up" and "close" ports are connected.

In another section of the valve body 20, space is provided for a small operating cylinder 50 and transfer rod 51 working inside this cylinder 50. The transfer rod 51 is located parallel to the valve spool 22 and has a piston 52 formed about its center. After installation of the transfer rod 51, threaded end bushings 53 are screwed into the valve body 20, forming a fluid-tight seal around the transfer rod 51 and limiting the stroke of the rod. Intersecting each end of the operating cylinder 50 is a drilled cylinder passage 54 and 55, and these passages are immediately adjacent to the "down" port 46 and the "up" port 48 passages respectively. As shown in Figure 5, each of these two pairs of adjacent passages is fed from a common port. Therefore, fluid pressure in the "down" port 46 will push the transfer rod 51 to the right, and pressure in the "up" port 48 will push the transfer rod 51 to the left. The right-hand end of the transfer rod 51 outside of the bushing 53 is provided with a circular disc 56 held in a vertical position against the transfer rod 51 with a disc screw 57.

The right-hand spool end 25 has a rectangular slot 58 cut from top to bottom, through which is inserted an arm 59 mounted on a pivot 60 in the valve body 20 below the right-hand spool end 25. The arm 59 moves toward or away from the valve body 20 when rotated about its pivot 60. The upper end of this arm 59 is high enough to be contacted by travel of the transfer rod disc 56 when the former is in a neutral upright position, but when the arm 59 is inclined from the vertical, the disc 56 will pass over it. The lower end of the arm 59 has a slotted hole 61 which is pin-connected to a shaft 62 entering the valve body 20 in a line parallel to the axis of the valve spool 22. At its inner end, the shaft 62 is surrounded by a two-way spring 63 which normally holds the arm 59 in a vertical position, or will return the arm 59 to the vertical after it is rotated in either direction.

As pointed out previously, the valve spool 22 is operated mechanically by the landing gear mechanism. However, in order to achieve several beneficial results, the gear mechanism actually contacts an auxiliary rod which moves the valve spool. As shown in Figure 6, two offset links 64 are bolted, one end of each perpendicularly to one spool end 24 and 25. Through the other ends of the offset links 64 passes a spring-loaded auxiliary rod 65 which may be compressed from its normal length against the spring action, but not elongated. This auxiliary rod 65 rides in two hangers 66 bolted to the valve body 20. By this means of support, the valve spool 22 is kept from turning in the sleeve 21, so that the spool slot 58 will not bind against the pivoted arm 59 which goes through it.

The spring action of the auxiliary rod 65 prevents the landing gear mechanism (yet to be described) from exerting an overload on the valve proper by the fact that special rod fittings 67 and 68 threaded on the auxiliary rod 65 pass through the offset links 64. These fittings are adjusted to bear against the inner sides of the offset links 64 when in the normal condition of the auxiliary rod 65, but either fitting may slide in the offset link when the auxiliary rod 65 is compressed after the limit of valve spool travel has been reached. This actuating arrangement has another advantage in that full adjustments for valve stroke and relative position of valve assembly to actuating mechanism can be easily made, using the special fittings 67 and 68 and an adjustable end-bearing fitting 69 which is also screwed onto the auxiliary rod 65, as shown in Figure 4.

Figure 3 shows the gear retraction path and actuating mechanism. A side brace 74, jointed near its center 75, bends upwardly at this joint, and the shock strut 7 rotates clockwise about the trunnion pin 2 until the landing wheel 11 is above the wing lower surface 4. At this position, a shock strut roller 76 contacts and operates an uplock hook 77 to lock the gear assembly in the retracted position. Power for this gear operation is supplied by a hydraulic gear actuating cylinder 78 connected to the upper end of the side brace 74 and to the shock strut 7 above the trunnion pin 2.

In Figure 4, the landing gear and uplock mechanism which operates the sequence valve assembly 79 may be seen. In the down position of the gear, a bracket 80 bolted to the side brace 74 comes into contact with the auxiliary rod 65 as the side brace straightens out, thus pushing the valve spool 22 to its left-hand position. In the up position of the gear, the sequence valve is operated by the uplock mechanism as follows: The uplock hook 77 is pivoted to the uplock structure 81 near its upper end at point A, and pin-connected to an intermediate link 82 at its lower end B. The intermediate link 82 connects at point C to an operating link 83 which rotates about a fixed point D. On this operating link 83 is attached an arm assembly 84 located to contact the auxiliary rod 65 when the uplock hook 77 is closed under the shock strut roller 76 in the gear up position, as pictured. In this position, points B, C, and D are substantially in a straight line. To reach the hook open position, the hook 77 swings to the right, and point C moves down, rotating the operating link 83 counterclockwise about point D, thus backing the arm assembly 84 away from the auxiliary rod 65. Now points A, B, and C are substantially in a straight line.

A high strength compression spring 85 is connected between a short extension 86 of the uplock hook 77 above its pivot A and an upper projection 87 of the operating link 83 above point D. It can be seen that this compression spring 85 tends to hold the hook 77 open when it is open, and also tends to hold it closed when closed. Approximately halfway open is the point where spring force is the greatest, and where the reversal of spring-urged direction occurs. Mechanical stops (not shown) are provided to prevent the links from continuing past the open and closed positions as defined above.

In this particular instance, two springs are preferably employed, the second compression spring 88 being connected between a lower projection 89 of the operating link 83 below point D and a fixed point on the uplock structure 81 to the right of this operating link 83. This second spring 88 always tends to push the hook linkage to the closed position, in order to provide a positive closing force. As the strut roller 76 contacts the uplock hook lip 90 in approaching the gear up position, and forces the hook past the first spring's reversal point, both springs 85 and 88 provide enough force to actually lift the gear assembly 1 to its final position. It is at the time when the hook 77 is closed sufficiently to pull the gear into the uplock that the sequence valve is operated by the arm assembly 84. This prevents the gear from falling due to the pressure reduction occurring when the landing gear door 6 closes. Uplock release is accomplished by a cable-actuated rod 91 acting on an operating link fitting 92 which rotates the operating link 83 downwardly.

The landing gear hydraulic circuit, shown schematically in Figure 8, consists of a pilot-operated four-way selector valve 95, landing gear door actuating cylinder 15, door sequence valve assembly 79 with operating cylinder 50 attached, and main landing gear actuating cylinder 78. In the position shown, the gear is full up and the gear door 6 to which the door actuating cylinder 15 is attached is closed. The selector valve 95 contains a pressure port P, a return port R, a "down" port D, and an "up" port U. The movable cross-hatched portion 97 of the valve represents the valve plug, showing the valve with pressure to the "up" line. Ninety degrees counterclockwise rotation would place the valve plug 97 in the "down" position, as shown by the dotted lines, while midway between these two positions is neutral, where the pressure port P is cut off and both ports D and U are open to the return R.

From the valve "up" port U, hydraulic fluid simultaneously enters the "up" port 48 of the sequence valve 79 and the "up" port 98 of the main gear actuating cylinder 78. The fluid lines 99 to the sequence valve operating cylinder 50 shown in this figure represent the drilled cylinder passages 54 and 55 immediately adjacent to and communicating with the sequence valve "down" and "up" ports 46 and 48 of Figure 7. The selector valve "down" port D similarly connects to the "down" port 46 of the sequence valve 79 and the "down" port 100 of the gear actuating cylinder 78. The "close" and "open" ports 45 and 47 of the sequence valve 79 connect respectively to the "close" and "open" ports 101 and 102 of the door actuating cylinder 15.

The operation of the sequence valve may best be understood by describing a landing gear extension and retraction cycle, while reference is made to Figures 7 and 8. The valve as here depicted is in the gear up position, with the landing gear door 6 (Figure 1) closed and locked. Placing the landing gear selector valve 95 in the "down" position, pressure is directed through port D to the "down" port 100 of the gear actuating cylinder 78 and to the "down" port 46 of the sequence valve 79. The landing gear, being locked in the uplock hook 77, does not move. In the sequence valve 79, pressure enters cylinder passage 54 and acts on transfer rod piston 52, extending the transfer rod 51. Transfer rod circular disc 56 contacts the upper end of arm 59 rotating it about pivot 60, which in turn moves shaft 62 compressing two-way spring 63. As the transfer rod 51 continues its travel, it passes over arm 59 allowing it to return to neutral by the action of the two-way spring 63. The transfer rod 51 is now extended and the arm 59 centered. However, the valve spool 22 did not change position since the arm 59 only moved in the spool slot 58.

The oil continues through valve "down" port 46, through valve passages and out valve "open" port 47 as described before, then proceeds to the "open" port 102 of the landing gear door cylinder 15 and opens the door 6. The first motion of the door cylinder 15 opens the door locks (not shown) and then continues to open the door 6 until it reaches its last five degrees of motion, at which point it pulls the uplock hook 77 open. This is accomplished by a direct mechanical cable connection 103, shown diagrammatically in Figure 8, operating on the cable-actuated rod 91 in Figure 4. The gear is then released and continues to its down position, the door 6 being held open by the same pressure that is extending the gear. After the door has pulled the uplock hook 77 open, a mechanism (not shown) releases the uplock from the door, so that the uplock hook, which will remain open of itself, can be closed again when the gear is retracted.

When the gear is almost to its extended position, the sequence valve spool 22 is moved to the opposite extreme by the bracket 80 on the side brace 74, reversing the flow in the sequence valve, putting pressure into the valve "close" port 45 and hence to the door cylinder "close" port 101, closing and locking the door 6.

With the sequence valve spool 22 now in the position opposite to that shown in Figures 7 and 8, the landing gear selector valve 95 is reversed and pressure comes through "up" port U, then to the "up" port 98 of the gear actuating cylinder 78 and the "up" port 48 of the sequence valve 79. In the sequence valve, fluid goes through cylinder passage 55, retracting the transfer rod 51 which passes by the arm 59, allowing the arm 59 to snap back to its neutral position by the action of the two-way spring 63.

The fluid also passes through the valve "up" port 48 directly through the valve and out the valve "open" port 47, operating the door cylinder 15 to open the landing gear door 6 in the same manner as stated above. However, as the door is opening, the gear is being released from the gear downlock (not shown) by the first motion of the landing gear actuating cylinder 78, but retracts only a small distance due to the fact that less pressure is required to open the door 6 than to retract the gear. After the door is fully open, the gear actuating cylinder 78 then has sufficient pressure to retract the gear into the uplock hook 77. The uplock mechanism then actuates the sequence valve spool 22 as previously described, reversing the pressure to the "close" port 101 of the door cylinder 15, closing the door 6.

It shall be noted that in operating the landing gear through the first phase of the extending motion, the gear door 6 being open and the gear halfway extended, it is possible to reverse the landing gear selector valve 95 putting pressure in the "up" port 48 of the sequence valve 79. The valve spool 22 position is that shown in Figures 7 and 8, but the transfer rod 51 has been extended. When pressure is applied to the valve "up" port 48, it retracts the transfer rod 51, pulling the arm 59 against the spool 22, and moves the spool to the opposite extreme, thus directing oil from the valve "up" port 48 to the valve "open" port 47, keeping the door 6 in the open position under pressure while the gear retracts. This is possible because less pressure is required to reverse the valve spool 22 by the transfer rod 51 than to operate the door cylinder 15. When the gear enters the uplock, sequence valve operation is the same as during normal retraction of the gear.

Therefore, it may be seen that in operating the landing gear from any position or at any time, the gear door is handled by the sequence valve resetting device to prevent collision between the landing gear and the door. Uplock operation is again pointed out. As the gear retracts to the point where the sequence valve reverses to close the door 6, and since the door cylinder 15 and gear actuating cylinder 78 are supplied by a common pressure line, a reduction in pressure will occur because of the flow through the door cylinder 15. This pressure reduction might allow the gear to fall; therefore, the positive uplock action previously described is provided to pull the gear into the uplock hook during the final locking motion.

Another important feature of the present hydraulic circuit is a two-way flow restrictor 104 (Figure 8) installed in one of the gear actuating cylinder supply lines 105. The purpose of this restrictor is to keep full hydraulic fluid pressure in the door cylinder 15 whenever the gear door 6 is open. If the restrictor were not present, door cylinder pressure would be greatly reduced when the landing gear is first dropped from the uplock hook 77 because the gear's weight would draw fluid from the airplane's hydraulic pump outlet at a rate exceeding the pump capacity. In this manner, side air loads on the door 6 could close the door to a position where it would interfere with the gear. However, the flow restrictor 104 is set at a flow rate less than the pump flow at its worst condition under the applicable flight conditions, so that full pressure is maintained in the door cylinder.

Hydraulic operating pressure used in this instance is 3,000 p. s. i. The sequence valve is, therefore, made with the lapped spool and sleeve combination to reduce leakage and sensitivity to dirt.

While the present invention has been described as used in connection with a retractable landing gear, it will be apparent to those skilled in the art that the invention will also be useful to synchronize two hydraulic cylinders performing operations requiring an unvarying sequence of operation.

What is claimed is:

1. In an airplane landing gear assembly wherein a retractable landing gear is housed in a structural cavity in said airplane and movable between extended and retracted terminal positions, said assembly having a gear door normally covering a portion of said cavity and movable to open and closed positions, a sequence control comprising hydraulic gear power means connected to move said gear between said terminal positions, hydraulic door power means connected to move said door between said open and closed positions, selector means having a "gear down" and a "gear up" position and connected with a given power source to energize said gear power means in either of said two directions, door reversing means operatively connected to said door power means and connected to said selector means in parallel with said gear power means, said reversing means having a first position wherein said "gear down" position of said selector means is connected to energize said door power means in a "door open" direction and said "gear up" position is connected to energize said door power means in a "door close" direction, and having a second position wherein said door power means is operatively connected to be energized in the opposite directions from the above recited condition, said reversing means being movable to either of said positions, first means actuated in response to movement of said gear to said retracted position connected to said reversing means to move said reversing means to said first position when in said second position, second means actuated in response to movement of said gear to said extended position connected to said reversing means to move said reversing means to said second position when in said first position, a gear uplock adapted to hold said gear in said retracted position against the downward energization of said gear power means, and release means connected to unlock said uplock when operated, said release means being positioned to be contacted and operated by said door upon reaching said open position, whereby said gear is extended only after said door is opened, hydraulic loads and hydraulic component sizes being relatively designed so that the hydraulic pressure required to operate said door power means to open said door is substantially less than that required to operate said gear power means to move said gear to said retracted position, whereby said gear is retracted only after said door is opened.

2. In an airplane landing gear assembly having a landing gear retractable into a structural cavity in said airplane and movable between extended and retracted terminal positions, said assembly having a gear door normally closing a portion of said cavity and movable to open and closed positions, a sequence control comprising the combination of a gear selector valve having a "gear up" position and a "gear down" position, and provided with fluid supply and return lines from a hydraulic power system, a double-acting hydraulic gear actuating cylinder connected to extend and retract said landing gear and supplied with fluid lines from said selector valve, a two-position gear door sequence valve also supplied with fluid lines from said selector valve, a double-acting hydraulic door actuating cylinder connected to open and close said gear door and supplied with fluid lines from said gear door sequence valve, said sequence valve being adapted to be moved to either of said positions, first means actuated in response to movement of said gear to said retracted position connected to said sequence valve to move said sequence valve to one of said positions from the other of said positions, said one position providing a passage for fluid under pressure from the "gear up" fluid line of said selector valve to said door actuating cylinder in the "door close" direction, and second means actuated in response to movement of said gear to said extended position connected to said sequence valve to move said sequence valve to said other position from said one position, said other position providing a passage for fluid under pressure from the "gear down" fluid line of said selector valve to said door actuating cylinder in said "door close" direction.

3. In an airplane landing gear assembly having a landing gear retractable into a structural cavity in said airplane and movable between extended and retracted terminal positions, said assembly having a gear door normally closing a portion of said cavity and movable to open and closed positions, a sequence control comprising the combination of a four-way gear selector valve having at least a "gear up" position and a "gear down" position and provided with fluid supply and return lines from a hydraulic power system, a selector valve "up" port arranged and connected to be open to fluid under pressure from said supply line when said selector valve is placed in said "gear up" position, and a selector valve "down" port connected to be similarly pressurized when said selector valve is placed in said "gear down" position, a double-acting hydraulic gear actuating cylinder connected to extend and retract said landing gear and supplied with "up" and "down" ports connected respectively to said selector valve "up" and "down" ports, a two-position four-way gear door sequence valve having "up" and "down" ports also connected respectively to said selector valve "up" and "down" ports and having an "open" port and a "close" port, a double-acting hydraulic door actuating cylinder connected to open and close said gear door and having "open" and "close" ports connected respectively to said sequence valve "open" and "close" ports, said sequence valve being adapted to be moved to either of said positions, first means actuated in response to movement of said gear to said retracted position and adapted to move said sequence valve to one of said positions wherein said sequence valve "up" port is open to said sequence valve "close" port, and second means actuated in response to movement of said gear to said extended position adapted to move said sequence valve to the other of said positions wherein said "down" port is open to said "close" port.

4. In an airplane landing gear assembly having a landing gear retractable into a structural cavity in said airplane and movable between extended and retracted terminal positions, said assembly having a gear door normally closing a portion of said cavity and movable to open and closed positions, a sequence control comprising the combination of a four-way gear selector valve having at least a "gear up" position and a "gear down" position and provided with fluid supply and return lines from a hydraulic power system, a selector valve "up" port arranged and adapted to be open to fluid under pressure from said supply line when said selector valve is placed in said "gear up" position, and a selector valve "down" port adapted to be similarly pressurized when said selector valve is placed in said "gear down" position, a double-acting hydraulic gear actuating cylinder connected to extend and retract said landing gear and supplied with "up" and "down" ports connected respectively to said selector valve "up" and "down" ports, a two-position four-way gear door sequence valve having "up" and "down" ports also connected respectively to said selector valve "up" and "down" ports and having an "open" port and a "close" port, a double-acting hydraulic door actuating cylinder connected to open and close said gear door and having "open" and "close" ports connected respectively to said sequence valve "open" and "close" ports, said sequence valve being adapted to be moved to either of said positions, first means actuated in response to movement of said gear to said retracted position adapted to move said sequence valve to a first position wherein said sequence valve "up" port is open to said sequence valve "close" port and said sequence valve "down" port is open to said sequence valve "open" port, and second means actuated in response to movement of said gear to said extended position adapted to move said sequence valve to a second position wherein said "down" port is open to said "close" port and said "up" port is open to said "open" port.

5. Apparatus in accordance with claim 4, wherein said sequence valve includes third means adapted to be moved to two opposite positions by fluid pressure at opposite respective sides thereof, fluid supply means always connecting said sequence valve "up" port with one side of said third means, and additional fluid supply means always connecting said sequence valve "down" port with the opposite side of said third means, said third means having a driving relationship with said sequence valve whereby said sequence valve is reversed when said selector valve is reversed at gear positions between said terminal positions, thus retaining pressure at said door actuating cylinder "open" port to hold said door open until said gear has reached one of said terminal positions.

6. Apparatus in accordance with claim 4, wherein said sequence valve comprises a body, a fixed cylindrical sleeve contained in said body, a cylindrical spool lapped to the interior of said sleeve, said spool being slidable in said sleeve to either of two opposite end positions to thereby respectively define said first and second valve positions and having protruding spool ends for mechanically sliding said spool to either of said two positions, said body containing said sequence valve "up," "down," "close" and "open" ports, said valve ports communicating with appropriate fluid passages in said sleeve and in said spool for obtaining the specified internal port connections as recited in claim 4.

7. Apparatus in accordance with claim 4, wherein said sequence valve comprises a body, a fixed cylindrical sleeve contained in said body, a cylindrical spool lapped to the interior of said sleeve, said spool being slidable in said sleeve to either of two opposite end positions to thereby respectively define said first and second valve positions and having protruding spool ends for mechanically sliding said spool to either of said two positions, said body containing said sequence valve "up," "down," "close" and "open" ports, said valve ports communicating with appropriate fluid passages in said sleeve and in said spool for obtaining the specified internal port connections as recited in claim 4, and wherein said sequence valve includes third means adapted to be moved to two opposite positions by fluid pressure at opposite respective sides thereof, fluid supply means always connecting said sequence valve "up" port with one side of said third means, and additional fluid supply means always connecting said sequence valve "down" port with the opposite side of said third means, said third means having a driving relationship with said valve spool whereby said spool is reversed when said selector valve is reversed at gear positions between said terminal positions, thus retaining pressure at said door actuating cylinder "open"

port to hold said door open until said gear has reached one of said terminal positions.

8. Apparatus in accordance with claim 4, wherein said sequence valve comprises a body, a fixed cylindrical sleeve contained in said body, a cylindrical spool lapped to the interior of said sleeve, said spool being slidable in said sleeve to either of two opposite end positions to thereby respectively define said first and second valve positions and having protruding spool ends for mechanically sliding said spool to either of said two positions, said body containing said sequence valve "up," "down," "close" and "open" ports, said valve ports communicating with appropriate fluid passages in said sleeve and in said spool for obtaining the specified internal port connections as recited in claim 4, and wherein said sequence valve is also provided with spool resetting means comprising a transfer cylinder substantially parallel to said spool, a transfer rod and piston operating in said transfer cylinder, said transfer cylinder being open at one end to said valve "down" port and open at the opposite end to said valve "up" port, an operating member attached to one end of said transfer rod, means defining a slot in one end of said spool, an arm extending through said slot, said arm being pivoted on one side of said spool end and so shaped to be contacted and rotated about said pivot by said operating member when said transfer rod passes through the approximate center of its stroke, said operating member passing over and separating from contact with said arm before said transfer rod reaches the end of its stroke, said slot having sufficient length that said spool can be reciprocated between its stroke limits without striking said arm when said arm is perpendicular to said spool but short enough so that said spool can be moved from one end position to the other by the rotational movement of said arm caused by said operating member in passing between the limits of movement of said transfer rod, and elastic centering means connected to return said arm to said perpendicular position, said resetting means moving in a direction to move said spool to said first position with pressure in said valve "down" port, and vice versa, whereby said spool is reversed when said selector valve is reversed at gear positions between said terminal positions, thus retaining pressure at said door actuating cylinder "open" port to hold said door open until said gear has reached one of said terminal positions.

9. Apparatus in accordance with claim 4 wherein said sequence valve comprises a body, a fixed cylindrical sleeve contained in said body, a cylindrical spool lapped to the interior of said sleeve, said spool being slidable in said sleeve to either of two opposite end positions to thereby respectively define said first and second valve positions and having protruding spool ends for mechanically sliding said spool to either of said two positions, said body containing said sequence valve "up," "down," "close" and "open" ports, four fluid-carrying grooves around the circumference of said sleeve, each groove communicating with one of said ports and with the interior of said sleeve at predetermined points, three circumferential fluid-carrying grooves on said spool, a hollow passage in the core of said spool communicating only with the end two of said spool fluid grooves, said spool fluid grooves being so dimensioned and located with respect to said predetermined points on the interior of said sleeve that said first valve position provides a fluid path between said valve "up" and "close" ports via said hollow core and said end two spool grooves, and a separate fluid path between said valve "down" and "open" ports via the center one of said spool grooves, and such that said second valve position provides a fluid path between said valve "down" and "close" ports via said center spool groove, and a separate fluid path between said valve "up" and "open" ports via one of said end spool grooves.

10. A four-way hydraulic valve comprising a body containing a fixed cylindrical sleeve internally carrying a slidable cylindrical spool, said body having four ports, each of said ports communicating with one of four oil-carrying grooves around the circumference of said sleeve, each of said sleeve oil grooves communicating by means of radially drilled sleeve passages with the interior of said sleeve, said spool having three circumferential oil-carrying grooves, the end two of said spool oil grooves communicating by means of radially drilled spool passages with a hollow passage in the core of said spool, said spool oil grooves being located with respect to said radially drilled sleeve passages such that when said spool is pushed to one extreme end position within said sleeve, the inner ends of said sleeve passages connected with the first of said sleeve oil grooves are open to one of said spool end grooves and the inner ends of said sleeve passages connected with the fourth of said sleeve oil grooves are open to the other of said spool end grooves, thus connecting the first of said ports to the fourth of said ports, the inner ends of said sleeve passages connected with the second of said sleeve oil grooves are open to the center one of said spool oil grooves and the inner ends of said sleeve passages connected with the third of said sleeve oil grooves are also open to said spool center groove, thus connecting the second of said ports to the third of said ports, and such that when said spool is pushed to the opposite extreme end position within said sleeve, said first sleeve oil groove passages and said second sleeve oil groove passages are both open to said spool center groove, thus connecting said first port to said second port, said third sleeve oil groove passages and said fourth sleeve oil groove passages are both open to one of said spool end grooves, thus connecting said third port to said fourth port, no other fluid path existing than the paths herein specified, both ends of said spool extending through said body whereby said spool may be operated from one end position to the other, or vice-versa, a spool resetting means for said valve comprising a transfer cylinder substantially parallel to said spool and containing a transfer piston with a transfer rod attached thereto, said transfer cylinder being open at one end to said second port and open at the opposite end to said fourth port, said second and fourth ports being pressure and return ports respectively, or vice-versa, an operating member attached to one end of said transfer rod, an arm extending through a slot in one end of said spool, said arm being pivoted on one side of said spool end and so shaped to be contacted and rotated about said pivot by said operating member when said transfer rod passes through the approximate center of its stroke, said operating member passing over and separating from contact with said arm before said transfer rod reaches the end of its stroke, said slot having sufficient length that said spool can be reciprocated between its stroke limits without striking said arm when in a position perpendicular to the longitudinal axis of said spool, but short enough so that said spool can be moved from one end position to the other by the rotational movement of said arm caused by said operating member in passing back and forth between the limits of movement of said transfer rod, and elastic centering means attached to said arm to return said arm to said perpendicular position after said operating member has passed over said arm, said resetting means acting to immediately reverse the position of said spool each time said second and fourth ports are alternated from pressure and return ports, respectively, to return and pressure ports, respectively, or vice-versa.

JOHN R. CLIFTON.
STANLEY R. PARKER.

REFERENCES CITED

The following references are of record in the file of this patent:

UNITED STATES PATENTS

| Number | Name | Date |
|---|---|---|
| 948,649 | Koelkebeck | Feb. 8, 1910 |
| 1,016,167 | McCulloch | Jan. 30, 1912 |
| 1,855,434 | Vickers | Apr. 26, 1932 |
| 2,001,620 | Levy | May 14, 1935 |
| 2,351,284 | Overbeke | June 13, 1944 |
| 2,365,748 | Curtis | Dec. 26, 1944 |
| 2,452,787 | Patch | Nov. 2, 1948 |